March 6, 1934.  C. M. WOEHLE  1,949,555
RAILROAD FREIGHT CAR AND DOOR MECHANISM THEREFOR
Filed May 13, 1932  3 Sheets-Sheet 1
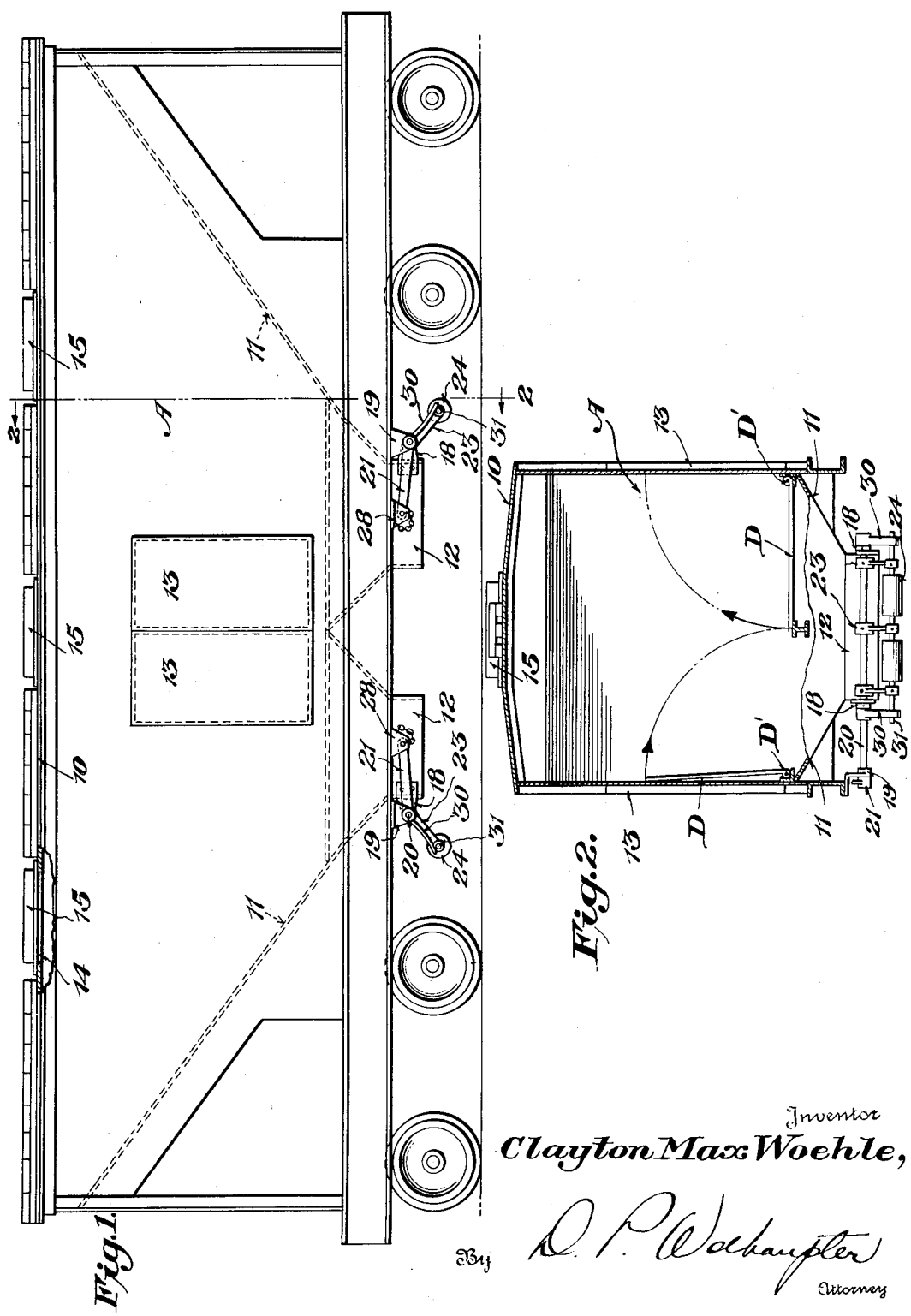
Inventor
Clayton Max Woehle, March 6, 1934.    C. M. WOEHLE    1,949,555
RAILROAD FREIGHT CAR AND DOOR MECHANISM THEREFOR
Filed May 13, 1932    3 Sheets-Sheet 2
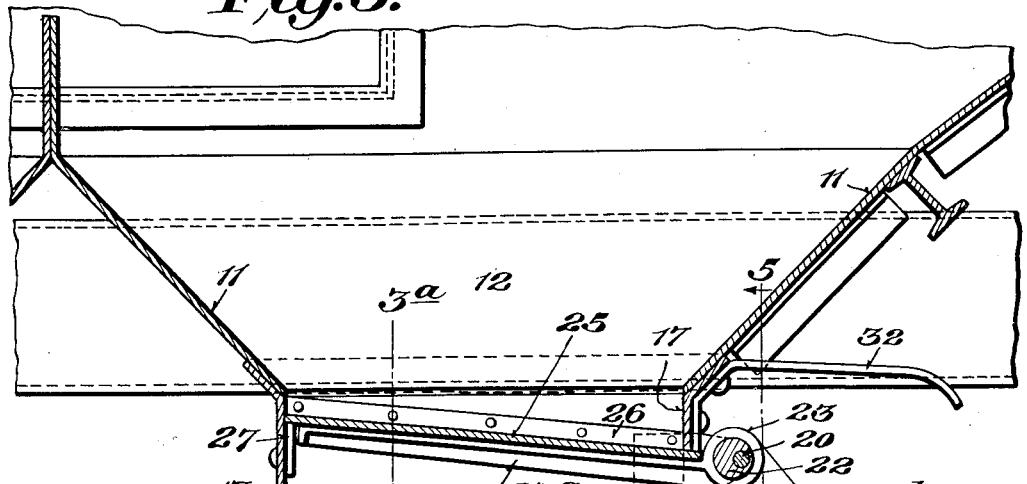
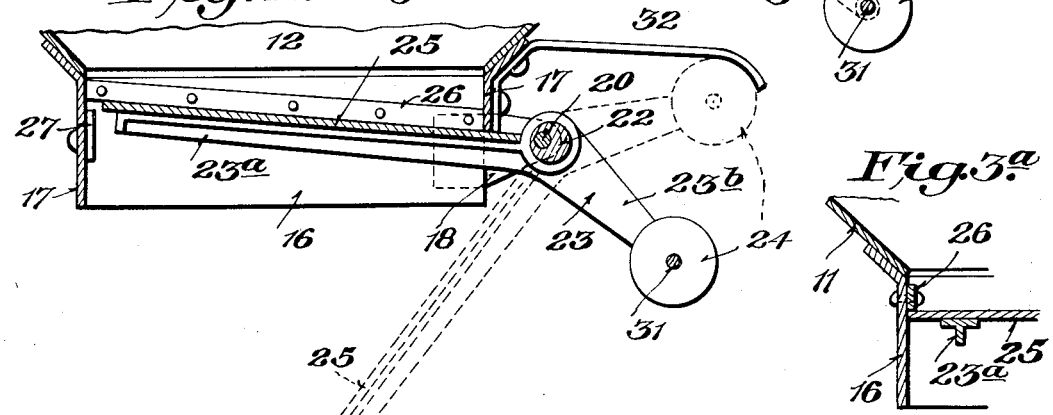
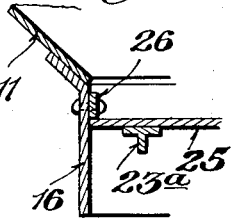
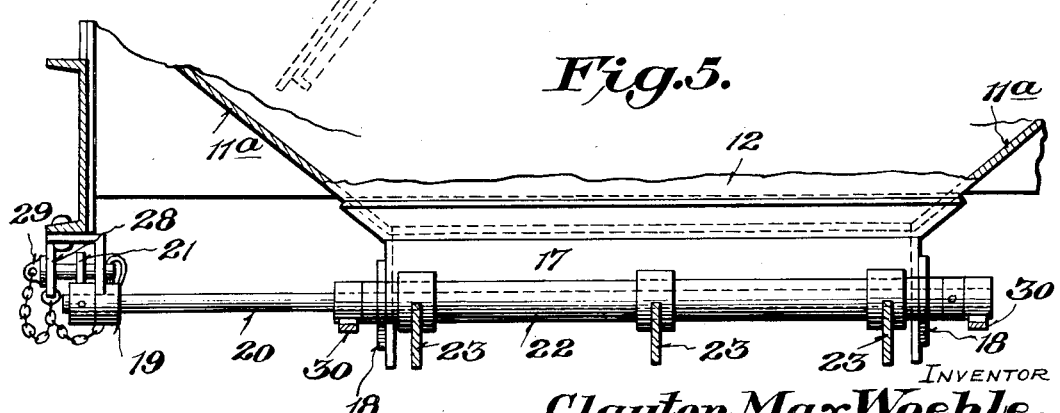
INVENTOR
Clayton Max Woehle,
By O. P. Wolhaupter
Attorney March 6, 1934.  C. M. WOEHLE  1,949,555
RAILROAD FREIGHT CAR AND DOOR MECHANISM THEREFOR
Filed May 13, 1932   3 Sheets-Sheet 3
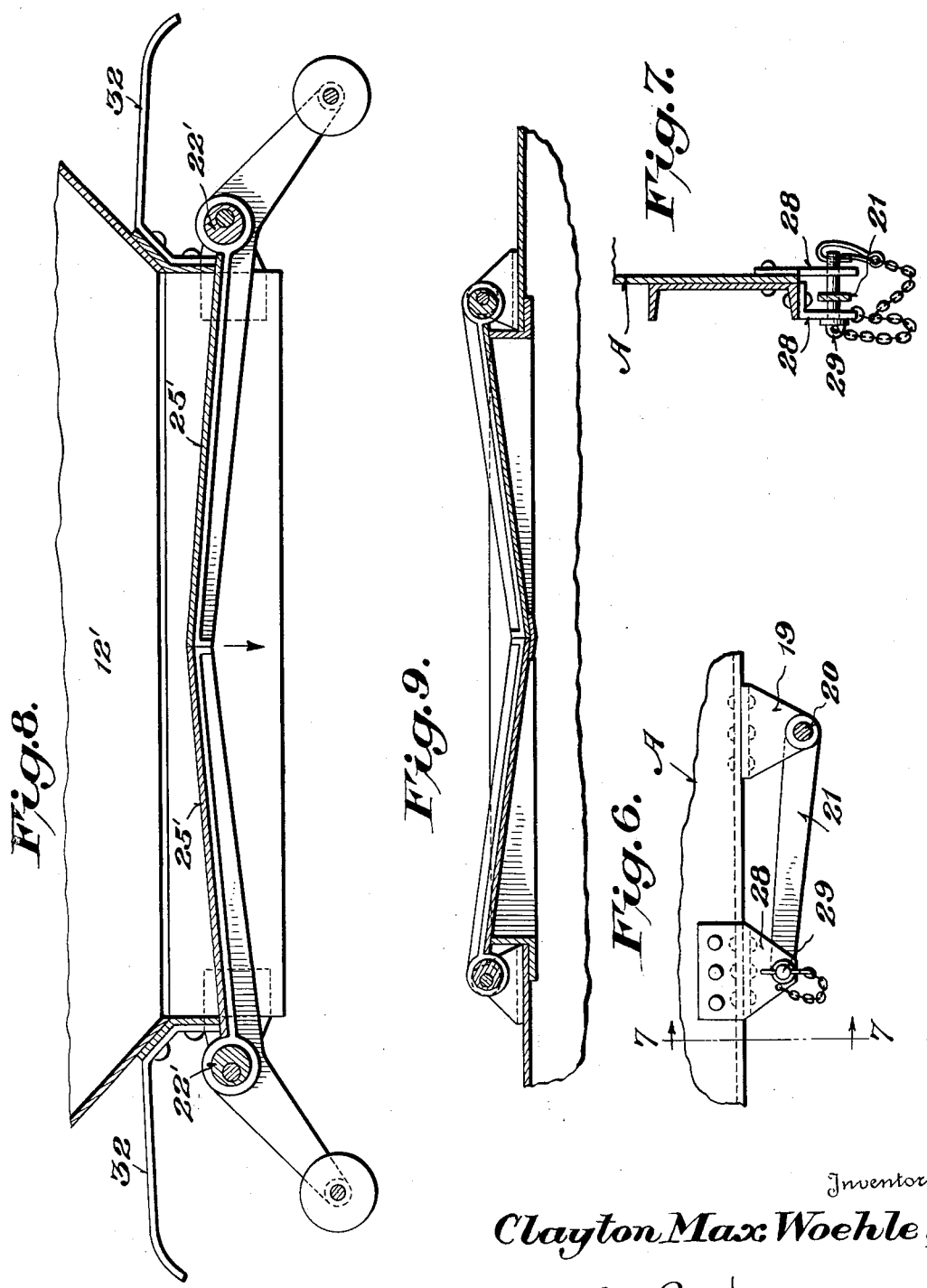
Inventor
Clayton Max Woehle,
By C. P. Wolhaupter
Attorney Patented Mar. 6, 1934

1,949,555

UNITED STATES PATENT OFFICE 1,949,555

RAILROAD FREIGHT CAR AND DOOR MECHANISM THEREFOR

Clayton Max Woehle, Dillsburg, Pa.

Application May 13, 1932, Serial No. 611,163

3 Claims. (Cl. 105—248)

This invention relates to railroad cars, and has generally in view to provide an improved freight car of the hopper type.

Hopper cars as heretofore constructed have invariably been of the open-top body type suitable only for transporting such products as coal and the like which are not harmed by exposure to the weather. For this reason, the general practice has been to employ cars of the box-car or covered body type for the transportation of grain and other perishable products because of the protection from the weather afforded by such cars for their contents. Box cars, however, are invariably hopperless and provided only with side doors. Consequently, the time required for the loading and unloading of box cars is considerably greater than the time required for the loading and unloading of hopper cars, despite the provision of special and expensive apparatus for tilting box cars to facilitate employing of the same.

Furthermore, hopper bottom cars now in general use are of limited utility in the respect that they are generally returned, or used one way, in an empty condition. By the present invention, however, it is proposed to provide a novel sectional bottom construction which may be folded vertically against the sides of the car body when the car is in service as a hopper car but which can be lowered to a horizontal position to provide a flat floor when the car is to be used for box car consignments.

Accordingly, a special object of the invention is to provide a car of a new type embodying the desirable features of both a box car and a hopper car, whereby grain and like products are afforded complete protection from the weather during transportation and whereby the car may be loaded and unloaded with facility and rapidity without employing special and expensive car tilting apparatus, and on the other hand, after being unloaded can be made ready as a box car to handle a different cargo on its return trip.

Another object of the invention is to provide a novel car door mechanism which is suitable for use in connection with both hopper and side door openings, and which possesses the advantages of simplicity of construction, cheapness and ease of manufacture and installation, strength and durability, affording a tight closure, and ease and facility of manipulation to locked and unlocked and closed and opened positions.

Another object of the invention is to provide a novel and improved door mechanism which, as applied to hoppers, possesses the characteristic of being self-closing, whereby any danger of the door remaining in a dropped or open position in which it might engage track obstructions is effectively avoided.

With the foregoing and other objects in view, which will become more fully apparent as the nature of the invention is better understood, the same consists in the novel combinations and arrangements of features of construction as will be hereinafter more fully described, illustrated in the accompanying drawings and defined in the appended claims.

In the drawings, wherein like characters of reference denote corresponding parts in related views:—

Figure 1 is a side elevation of a railroad freight car constructed in accordance with one practical embodiment of the invention.

Figure 2 is a vertical sectional view taken on the line 2—2 of Figure 1.

Figure 3 is an enlarged longitudinal section through the hopper showing the door in a fully closed position.

Figure 3a is a detail sectional view taken on the line 3a—3a of Figure 3.

Figure 4 is a view similar to Fig. 3 showing by dotted and full lines, respectively, the door in an open position and in the position it normally assumes automatically.

Figure 5 is a transverse section on the line 5—5 of Fig. 3.

Figure 6 is a detail elevation of the cam shaft rotating lever and the keeper means therefor.

Figure 7 is a transverse section on the line 7—7 of Fig. 6.

Figure 8 is a view similar to Fig. 3 illustrating an alternative embodiment of the invention; and Figure 9 is a horizontal sectional view illustrating a door mechanism of the general type shown in Fig. 8 associated with a side door opening.

Referring to the drawings in detail and with particular reference to Figs. 1 and 2, it will be observed that the car, designated generally as A, is what may appropriately be termed a combination box-car and hopper car, inasmuch as the body of the car is of normal box-car height having side and end walls and a top cover or roof 10, and also since the bottom walls 11 thereof are inclined downward from the side and end walls towards bottom outlets or hoppers 12 located near the center of the car. As many of these hoppers 12 may be provided as desired, and they may be controlled by door mechanisms of any suitable or preferred type.

Moreover, the car may also be provided with side doors 13 in accordance with general practice in box-car constructions. However, in order to facilitate filling of the car with grain or the like the top cover or roof 10 thereof is provided at suitably spaced points along its length with a plurality of filling openings 14 to be closed normally by suitable hatches or other coverings 15. When the car is to be used for consignments other than that type discharged through a hopper, the bottom sections D may be folded down over the hoppers 12 to provide a flat floor. That is to say, the sections D may be hinged as at D' to the sides of the car walls, and when not in use are vertically disposed. The fact that they will cover the inside faces of the doors 13 when elevated is advantageous since they will afford additional sealing means for the doorways. On the other hand, when they are dropped to a horizontal position, they will cover the hoppers and provide a complete floor for sustaining a load or cargo of the kind usually shipped in box cars. The sections D may, in their lowered positions, rest upon the framework. This framework may consist of suitably disposed I-sections or angles forming a skeleton support for the doors.

Obviously, a car as illustrated and described has the advantages that it may easily and rapidly be filled and emptied and that it affords complete protection for its contents from the elements. Accordingly, it is particularly adapted for dual service such as the transportation of grain and the like which may be delivered into and discharged from the car through the top openings 14 and the hoppers 12, respectively, and other products which must be protected from the weather while they are in transit.

Referring now to the improved hopper door mechanism illustrated in detail in Figs. 1 to 7 of the drawings, it will be observed that the mouth of the hopper is defined by vertical side and end walls 16 and 17, respectively, and that secured to the side walls 16 and projecting beyond corresponding ends thereof are bearings 18 which are alined, transversely of the car, with each other and with a third bearing 19 suitably secured to a side portion of the car.

In the bearings 18 and 19 is journaled a shaft 20 which has fixed thereto, outwardly of the bearing 19, one end of an actuating lever 21 and which carries, rigidly therewith, between the bearings 18, a cam or eccentric 22 having rotatably mounted thereon a plurality of arms 23. The eccentric 22 may be a single elongated member, as shown, common to both arms, or, may obviously be in the form of a single cam or eccentric at the location of each arm 23.

The arms 23 are mounted intermediate their ends on the cam or eccentric 22 and have portions 23ª extending in the direction of the hopper and other portions 23ᵇ extending in the opposite direction. As shown, the portion 23ᵇ may be connected by a rod 31 which is provided with weights 24 whereby the hopper closure plate or door 25, mounted on the portions 23ª, is caused to assume, normally, a substantially horizontal hopper closing position. In this position the door engages a suitable stop 26 which may be constituted, for example, by the lower edge of a strip or plate secured to the side walls 16 of theh opper, all as clearly illustrated in Figs. 3a and 4 of the drawings.

On the inner face of the hopper end wall 17 remote from the shaft 20 is provided a suitable ledge 27 the top of which is disposed slightly below the adjacent or free end of the door 25 when the latter is in its raised or normal position assumed under the influence of the weights 24. In this connection it will be noted that the diameter of the cam 22 and its eccentricity relative to the shaft 20 is such that by partial rotation thereof when the door 25 is in its raised position, said door may be shifted in the plane thereof either to a position in which its free end portion overlies the ledge 27, as illustrated in Fig. 3, or to a position in which its free end portion is retracted relative to said ledge, as illustrated by the full lines in Fig. 4, to permit downward swinging movement thereof to an open position as illustrated by the dotted lines in Fig. 4.

The lever arm 21 is so angularly related to the cam 22 that when the latter is in a position as illustrated in Fig. 3 holding the door 25 with its free end portion overlying the ledge 27, said lever arm is disposed in a substantially horizontal position as illustrated in Fig. 6 with its free end portion overlapping a keeper plate or plates 28 secured to the car body. The keeper plate or plates, as the case may be, is or are provided with apertures and the arm 21 is provided with an aperture for alinement therewith when the arm is in its substantially horizontal position holding the door projected above the ledge 27. Consequently, by inserting a pin 29 or the hasp of a padlock or the like through the alined openings in the lever arm 21 and the keeper plate or plates the shaft 20 and the cam 22 may be secured against rotation thus to positively prevent retraction of the door from the ledge 27.

Assuming the door to be in its fully closed and locked position illustrated in Fig. 3, it is manifest that to unlock said door it is simply necessary to remove the pin or other fastener 29 to release the arm 21 and then, by means of said arm, to rotate the shaft 20 and the cam 22 through an angle sufficient to retract the free end portion of the door from the ledge 27, whereupon the door is free to swing downwardly to an open position under the influence of the weight of the contents of the car thereagainst.

After discharge of the contents of the car the weights 24 operate to return the door to the full line position illustrated in Fig. 4 to maintain the door in this position even if the pin or other locking means 29 is not reinserted into the alined openings of the arm 21 and the keeper plate or plates 28. Consequently, any danger of the door remaining in a dropped or open position in which it might engage any obstruction along the track is effectively avoided. In this connection it is necessary, before filling the car, to swing the lever arm 21 to project the free end portion of the door over the ledge 27 and at the same time it is desirable to insert the pin or locking means 29 to guard against any rotation of the cam 22 such as would produce retraction of the door from said ledge.

As previously stated the door 25 is automatically closed by the weight 24. However, to prevent the same rocking or swinging slightly when it is desired to project it over the ledge 27, the shaft 20 is provided with the spring arm or arms 30 which turn therewith and have their outer free ends bearing against the rod 31 which carries the weight. That is to say, the spring arm or arms 30, preferably made of spring strip stock, are carried by the shaft 20 in such angular relationship to the arm 21 and the cam 22, as to engage said rod and thereby positively rotate the arms 23 to swing the door to the limit of its upward closing movement simultaneously with rotation of the cam by the lever arm 21 to project the door over the ledge 27. In this connection it may be pointed out that the arm 30 slidably and yieldingly engages the rod 31 to compensate for the rotation of the cam necessary to effect projection of the door after the latter has been raised above the ledge 27.

Referring now to the embodiment of the invention illustrated Fig. 8 of the drawings, it will be observed that the door mechanism comprises, in effect, two separate but cooperating mechanisms which are, individually, substantially duplicates of the mechanism illustrated in Figs. 1 to 7. That is to say, a mechanism similar to the mechanism illustrated in Figs. 1 to 7 is provided at each end of the hopper 12' with the two door structures 25' of the respective mechanisms formed to extend upwardly and inwardly and to abut each other at their free or inner ends in a vertical plane when they are fully closed and projected by the cams 22'. Thus, the two door structures together form, when closed, an arch-like closure in which the end portion of each door serves as an abutment for the other door to prevent downward swinging movement of either door until at least one of the cams 22' has been rotated to retract its related door.

In both embodiments of the invention spring arms 32 or other suitable abutment means of a yieldable nature preferably are provided to be engaged by the weights 24 or by suitable portions of the arms 23 to cushion the opening movement of the doors in event the cargo swings them back with too much force.

Figure 9 of the drawings illustrates a door mechanism of the type illustrated in Fig. 8 as applied to a side door opening. In this application of the door mechanism the weights would serve no useful purpose. Therefore they are eliminated. In this connection the side door mechanism obviously may be of the single door type illustrated in Figs. 1 to 7, as well as of the double door type illustrated in Fig. 8. Moreover, it is to be understood, of course, that while the car illustrated in Figs. 1 and 2 preferably is equipped with hopper door mechanisms as herein illustrated and described, this is by no means essential, as the hopper door mechanisms may be of any other suitable type. Furthermore, it is manifest that while the present door mechanisms are particularly adapted for use on freight cars, they are by no means restricted to such uses.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. A door mechanism of the character described comprising, in combination with a structure having a door opening, a cam rotatably mounted at each of two opposite sides of said door opening, a door rotatably mounted on each cam for swinging movement to closed and opened positions, said doors when fully swung closed inclining inwardly relative to the plane of the door opening, the free ends of the doors having flat faces disposed in a plane parallel to the axes of the cams and at right angles to a plane including the axes of the cams when the doors are swung to their fully closed positions, and means for rotating the cams to shift the doors in the closed planes thereof towards each other thereby to bring their flat end faces into engagement with each other thus to lock the doors against opening swinging movement.

2. A door mechanism of the character described comprising, in combination with a structure having a door opening, a cam rotatably mounted at one side of said door opening, a door rotatably mounted on said cam for swinging movement to closed and opened positions, an abutment, a lever for rotating the cam to shift the door in the plane thereof behind said abutment, thereby to secure the door against opening swinging movement, and means to secure the lever in a position holding the cam against rotation when the door is closed and projected behind said abutment.

3. A door mechanism of the character described comprising, in combination with a structure having a bottom door opening, a horizontal shaft rotatably mounted at one side of said door opening, a cam rigid with said shaft, arms intermediately pivoted on said cam and having end portions extending, respectively, in the direction of and away from the door opening, a door carried by the first mentioned end portions of said arms, the other end portions of said arms being weighted to tend constantly to swing the door upwardly to a closed position relative to the door opening, an abutment at the side of the door opening opposite the shaft, a rod carried by the second mentioned end portions of said arms, means for rotating the shaft and cam to shift the door, when swung closed, in the plane thereof behind said abutment, and an arm on said shaft for engagement with said rod to impart closing swinging movement to the door when the shaft is rotated to shift the door in the plane thereof.

CLAYTON MAX WOEHLE.